(12) United States Patent
Gold

(10) Patent No.: X8122
(45) Date of Patent: Mar. 29, 1834

(54) OVENS,RETAINING,FOR BAKING & COOKING

(76) Inventor: Stephen J. Gold

Stephen J. Gold, Cornwall. Ct.

The Schedule referred to in these Letters Patent and making part of the same containing a description in the words of the said Stephen J. Gold, himself, of his improvement in the location of Fire for Baking and Cooking, it being a Retaining Oven.

To all to whom these presents shall come, Be it known that I Stephen J. Gold, of Cornwall, County of Litchfield and State of Connecticut, Have invented or discovered a new and useful improvement in the location of Fire or fuel, for the purpose of Baking and other Cooking in a retaining oven. and that the following is a full and exact description of said improvement as discovered by me, viz.

The oven is made of tin or other material that is an imperfect conductor of heat, made double, so as to confine air; which is another poor conductor of heat. Inside this oven is a furnace which is to contain the fuel to be burned when Baking, that all or nearly all the heat made by the fuel may be used, The dimensions and form of the oven and furnace may be as follows, Make a box from tin, 16 inches square, and 24 high, One side of the box open (this opening is for the door of the oven), The door should be also of tin made double, the plates being One inch apart, leaving a vacancy for confined air; Make a Second Box of the same material, 16 inches square at one end (which is the lower end) 14 inches wide and 15 inches deep at the upper end (the depth is from the open side of the box) and 23 inches high. This box has a head on the upper end, so also has the larger box, into which it is put, with the open side toward the door, with the edge of the opening oven, with the edge of the opening which left for the door, in the first described box. The vacancy in the two boxes is covered by a casing which will confine the air in the space between the two boxes, and against which, the door may shut, The lower edges of the boxes should be even, a bottom may be put
on this oven of a single thickness, securing the lower edges. This
being a form of the oven, with the door well fitted to the opening left
for it, and hung upon hinges. The oven should stand upon four legs
six inches high. There are shelves in the oven sufficient for con-
-venience. For further description of an oven confining air, see
S. Swift Gold Patent for the Union oven ~

In the bottom of this oven is a hole eight inches in
diameter, into which the furnace is set. The furnace may be
made of sheet iron, the diameter something less than the diam-
-eter of the hole in the bottom of the oven into which it is set.
resting upon a flange that is round the furnace, two inches
above the bottom of the furnace. The furnace should be eight
inches high, and may be perpendicular on its sides, having a
grate (upon which to lay the fuel) standing upon legs two inches
high - so that the bottom of the fire may be even with the bottom
of the oven. The air is received into the furnace below the bottom
of the oven in the side of the furnace above the bottom. The fur-
-nace should have a griddle or cover, on one side of the furnace
near the top, is an outlet or pipe 2 inches in diameter, this [illegible]
is long enough, to reach from the side of the furnace to the side
of the oven, when the furnace is in its place. Through the side
of the oven against the pipe of the furnace, is a hole two and a
half inches in diameter, through which is received a pipe of
the same size, this pipe should be two or three feet long outside
of the oven, rising perpendicularly from the hole through the oven,
The furnace may be varied in shape and size, so also may the
oven, What I claim as my improvement, is the location
of the furnace, viz inside an oven, or air confining oven ~

Witness
Benj. W. Gold
Samuel Hopkins

Stephen J. Gold.